United States Patent
Kumar et al.

(10) Patent No.: US 11,550,789 B2
(45) Date of Patent: Jan. 10, 2023

(54) CAPTURING QUERY EXECUTION STATISTICS

(71) Applicant: Oracle International Corporation, Redwood Shores, CA (US)

(72) Inventors: Rupesh Kumar, Redwood Shores, CA (US); Avi Huber, Los Altos, CA (US)

(73) Assignee: Oracle International Corporation, Redwood Shores, CA (US)

(*) Notice: Subject to any disclaimer, the term of this patent is extended or adjusted under 35 U.S.C. 154(b) by 52 days.

(21) Appl. No.: 16/920,248

(22) Filed: Jul. 2, 2020

(65) Prior Publication Data

US 2022/0004555 A1 Jan. 6, 2022

(51) Int. Cl.
*G06F 16/20* (2019.01)
*G06F 16/2455* (2019.01)
*G06F 11/34* (2006.01)
*G06F 11/30* (2006.01)

(52) U.S. Cl.
CPC ...... *G06F 16/24553* (2019.01); *G06F 11/302* (2013.01); *G06F 11/3495* (2013.01)

(58) Field of Classification Search
CPC ............ G06F 16/24553; G06F 11/302; G06F 11/3495
See application file for complete search history.

(56) References Cited

U.S. PATENT DOCUMENTS

| | | | | |
|---|---|---|---|---|
| 8,019,742 | B1* | 9/2011 | Baluja | G06F 16/951 |
| | | | | 707/706 |
| 11,204,898 | B1* | 12/2021 | Waas | G06F 16/1748 |
| 2009/0112795 | A1* | 4/2009 | Abraham | G06F 16/2462 |
| 2010/0082517 | A1* | 4/2010 | Schapker, II | G06F 16/217 |
| | | | | 707/E17.014 |
| 2011/0283283 | A1* | 11/2011 | Kuno | G06F 9/5083 |
| | | | | 718/101 |
| 2015/0381454 | A1* | 12/2015 | Holtom | G06F 16/248 |
| | | | | 707/722 |
| 2016/0248624 | A1* | 8/2016 | Tapia | H04L 41/5009 |
| 2016/0266920 | A1* | 9/2016 | Atanasov | G06F 11/301 |
| 2017/0147657 | A1* | 5/2017 | Bhave | G06F 16/338 |
| 2018/0336199 | A1* | 11/2018 | Ignatyev | G06F 9/4494 |
| 2020/0341819 | A1* | 10/2020 | Amemiya | G06F 9/5038 |

* cited by examiner

*Primary Examiner* — Tarek Chbouki
(74) *Attorney, Agent, or Firm* — Invoke (57) ABSTRACT

Techniques for capturing query execution statistics are disclosed. The disclosed system determines which queries are executing during a sampling interval. The system identifies related queries that share similarity criteria with the currently executing query. The system obtains query execution statistics for the query executing during the sampling interval and any related queries. The system generates or obtains statistics during a monitoring window that spans a longer period of time than a single intervening period between the current sampling interval and a prior interval. The statistics are stored in permanent storage or transmitted to a requesting computer. The system refrains from analyzing statistics for queries (and any related queries) that did not execute during a current sampling interval.

22 Claims, 5 Drawing Sheets

CAPTURING QUERY EXECUTION STATISTICS

TECHNICAL FIELD

The present disclosure relates to capturing query execution statistics.

BACKGROUND

Large organizations are often required to perform complex operations that rely on a large number of computer processes. These computer processes can be executed occasionally or on a scheduled basis. For example, an organization may wish to update its databases in response to changes. Database changes may take the form of query operations to the database that result in database operations such as data creation, data updates, and data deletion. Each query may execute for a certain period of time on a computing device.

During execution of these operations, administrators may wish to track progress of the execution. For example, one may wish to track the time period taken for a certain process's execution, the resources expended to execute the operation, and other execution-related statistics (e.g., a count of execution). A large number of processes may be running at a given time. Some processes may execute several times repeatedly. Certain processes may execute for a very brief period of time, making tracking difficult. Tracking the execution of each of multiple operations may cause overhead costs in the form of the additional resources required to comprehensively capture details of each execution's progress. For example, an execution monitoring operation on one computing device may require that details of every execution be recorded and transmitted to another computing device. This may mean that an excessive amount of computer processing resources and network resources may be used in monitoring the execution of a process in addition to the actual execution.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
    2. ARCHITECTURAL OVERVIEW
    3. QUERY EXECUTION DATA SAMPLING
    4. ILLUSTRATIVE EXAMPLE
    5. MISCELLANEOUS; EXTENSIONS
    6. HARDWARE OVERVIEW

1. General Overview

A system may continually monitor and store query execution statistics corresponding to the execution of queries. The query execution statistics (or raw data) for executions in a sliding monitoring window may be temporarily stored in a buffer and overwritten as additional query execution statistics are generated. The query execution statistics temporarily stored in the buffer may be captured by copying the query execution statistics to separate storage. Capturing query execution statistics may include converting raw data into a format suitable for analysis.

One or more embodiments determine whether to capture query execution statistics corresponding to a sliding monitoring window based on whether or not a query is executing during a sampling interval corresponding to the sliding monitoring window. The sampling interval may be a point-in-time or a period of time at the tail end of the corresponding monitoring window and/or subsequent to the corresponding monitoring window. The sampling interval may be significantly smaller than the actual monitoring window. A sliding monitoring window, from which data is captured, may span across a time period that includes other sampling intervals that do not trigger capturing of query execution statistics for the sliding monitoring window.

The system identifies the queries that are executing during the sampling interval. If the system determines that a particular query is executing during the sampling interval, the system captures query executions statistics corresponding to any executions of the particular query during the monitoring window. In addition, the system may capture query execution statistics corresponding to executions of any related queries during the monitoring window that share characteristics with the particular query, and/or meet a similarity threshold.

One or more embodiments described in this Specification and/or recited in the claims may not be included in this General Overview section.

2. Architectural Overview

Figure 1:
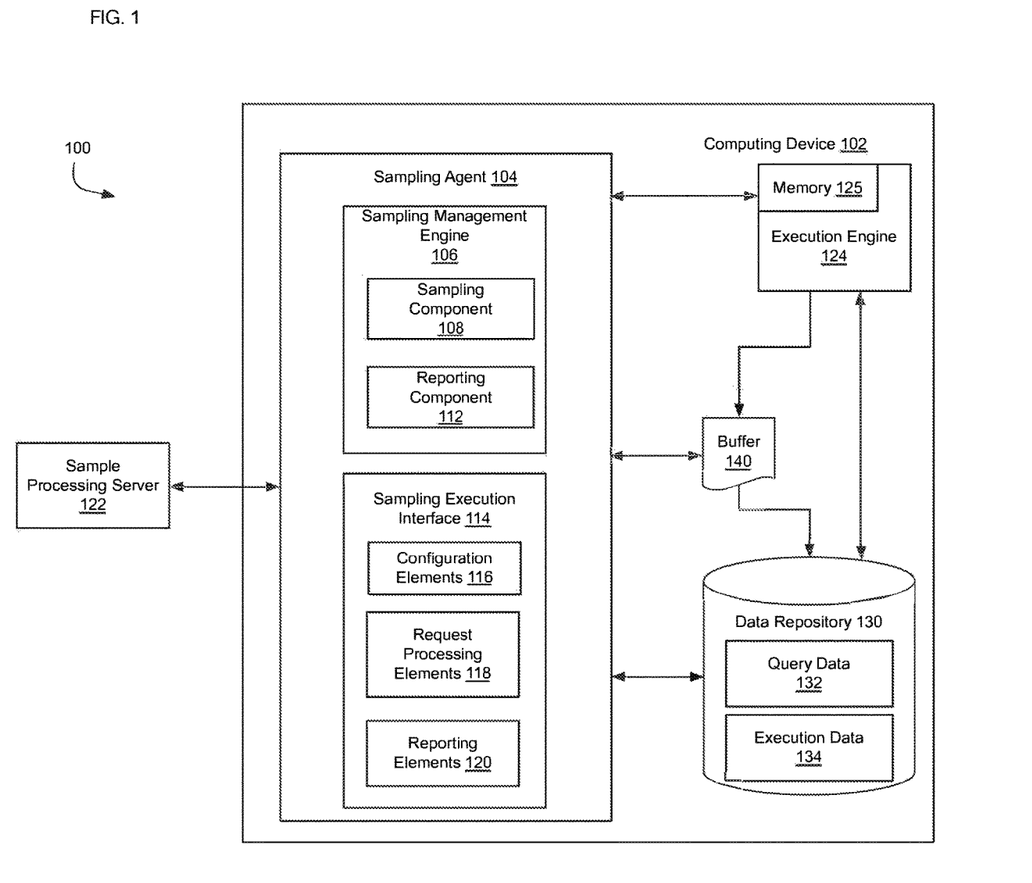
FIG. 1 shows a system for query execution data sampling in accordance with one or more embodiments.

FIG. 1 illustrates a system 100 for capturing query execution statistics in accordance with one or more embodiments. The system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

As illustrated in FIG. 1, system 100 includes sample processing server 122. System 100 also includes computing device 102 and various components thereof. In an embodiment, computing device 102 includes sampling agent 104, execution engine 124, data repository 130, and various sub-components thereof.

In an embodiment, computing device 102 includes execution engine 124. Execution engine 124 may be any software and/or hardware component that is configured to execute computer processes (e.g., database queries). For example, execution engine 124 may represent a virtual machine that acts as a virtual layer or abstraction layer for a physical computer and executes computer processes using other software or hardware components of computing device 102. Execution engine 124 may execute processes using a threaded execution scheme whereby a processor component of computing device 102 allocates processor time (or processor threads) to all or part of a process to be executed by execution engine 124.

As described above, execution engine 124 may be configured to execute one or more computer processes. For example, execution engine 124 may execute database queries. A database query may involve operations to create, read, update, or delete data from a database. These queries may be executed in response to a user instruction, executed in response to another computer instruction, or may be configured to execute at predetermined times. Each query may include multiple methods, routines, commands, or instructions. A query may include a number of preset or default commands or methods that are common to multiple queries. By contrast, a query may include certain methods that are key functions of the query. For example, the query may include certain commands that represent an important purpose or function of the query.

A query may be associated with a set of characteristics. Examples of query characteristics include, but are not limited to, the type of query, the query command, resources against which the query is executed, an amount of processing power necessary to execute the query, and an amount of time necessary to execute the query.

A set of "related queries" as referred to herein include queries that share one or more characteristics. A set of queries may be related queries if the queries meet one or more similarity criteria. A set of queries may be related queries if a hash of respective query characteristics results in the same hash value. The hash value may be used as an identifier, such that related queries correspond to the same query identifier.

Execution engine 124 may also be configured to execute other processes apart from database queries. For example, execution engine 124 may execute network processes, operating system processes, computing logging operations, application processing workloads (e.g., graphics processing workloads), or any computer processes capable of being executed by computing device 102.

In an embodiment, execution of each query may cause a certain amount of resource expenditure. For example, a database query may execute for a certain period of time and use a certain amount of computing resources, such as processor cycles, power, network resources, or the like. A database query may also involve processes that require exclusive access to the data during the execution of the query. In an embodiment, execution engine 124 may be configured to log or record details of the resources being used. For example, execution engine 124 may be configured to record the absolute time taken by a query's execution, the time that a central processing unit (CPU) of computing device 102 spent for executing the query, an amount of power or an amount of network resources used by the query, the amount of time the query had exclusive access to a resource, or the like.

Execution engine 124 may provide ways for other components to interact with execution engine 124. For example, execution engine 124 may expose application programming interfaces (APIs) that other programs can use in various ways. For example, the APIs of execution engine 124 may enable a program to view details of currently executing queries, initiate or stop queries, get data regarding completed queries, edit or modify queries, or the like. In an embodiment, execution engine 124 enables a program to request execution data for a query via a thread that is currently executing the query.

In an embodiment, execution engine 124 enables modification of an existing query that execution engine 124 can execute. A method of such modification may be, for example, bytecode instrumentation to modify the code of a compiled application, such as a Java™ application (JAVA is registered trademark of the Oracle Corporation, headquartered in Redwood Shores, Calif.). Bytecode instrumentation may serve to modify an application's code before or during the time that is being loaded for execution (e.g., when the application is being loaded into execution engine 124 for execution). In an embodiment, a user may add modifications to a Java application (e.g., an application that executes queries as described above). The modifications may be, for example, to include additional instructions to log details of the application's execution. For example, an application may be modified such that when a query executes, details of the query execution—also referred to herein as query execution statistics—are logged. These query execution statistics may also be transmitted to or retrieved by another program. As a result of the modification, execution engine 124 may be configured to, for instance, log each instance of execution of the query, a time taken by the execution of the query, a start time and end time of the query execution, or the like. Execution engine 124 may store a record of the query execution in, for example, data repository 130.

In an embodiment, the query itself may be configured to directly report details of the query's execution. As noted above, the query may be modified (e.g., with modifications to the query's application code or bytecode) to report query execution statistics. Additionally or alternatively, query execution statistics may be indirectly recorded. For example, a logging component (e.g., executed by execution engine 124) may register query executions each time a query is executed. Such a logging component (not shown) may be configured to, for example, record each time a data resource is modified in a specific way. The logging component may record particular network traffic that corresponds to execution of a certain query (e.g., download or upload of specific data). The logging component may determine that computer resources are being used in a specific (or signature way) that correspond to execution of a particular query.

In an embodiment, computing device 102 can include data repository 130. Data repository 130 may be configured to store query data 132 and execution data 134. In an embodiment, query data 132 may include query characteristics, query identifiers, query attributes, query parameters, query results, or any value associated with the characteristics or execution of a query or any process executed by execution engine 124. Query data 132 may include identifying data for all known queries that have ever executed on computing device 102 or are known to be executable by computing device 102. At any given time (e.g., during a sampling interval), some or all of these known queries may be executing (e.g., by execution engine 124). Similarly, some or all of these known queries may not be executing at a given time.

Alternatively or additionally, data repository 130 may be configured to store execution data 134. As described above, execution engine 124 may be configured to record details of query executions. More specifically, each application or each query executed by execution engine 124 may be configured with additional modifications (e.g., additional instrumentations or code). The modifications may cause generation of query execution statistics each time a query is executed. These query execution statistics may be stored as execution data 134. Execution data may be stored with reference to a particular query execution or type of process or may be aggregated across multiple query executions and/or types of processes. Execution data may include, for example, a number of successful executions of a particular query, the data resources associated with the query execution, dates associated with each query execution, or the like. In an embodiment, query execution statistics may be tracked for each execution of each query. However, the sampling processes described herein provide the ability to sample data only for specific query executions (e.g., only those that executed during the sampling interval) but still obtain query execution statistics for other related queries.

Particularly, execution data 134 can include execution times for each process. For example, each time a query is executed, execution engine 124 may log the time at which a query started execution (query start time) and the time a query ended execution (query end time). Execution engine 124 may also store, as execution data 134, the execution time that elapsed between the query start and end time. Execution engine 124 may also store whether the query completed successfully. As noted above, the query may have additional code or instrumentations that cause logging of time data related to each query execution.

Execution data 134 may also store the number of times a query has executed during a particular period of time. For example, each query may be configured (e.g., through additional modifications) to increment a value (e.g., a counter) each time the query starts. The query may be configured to directly execute query modifications that increment a counter value. Alternatively or additionally, an external logging component, as described above, may increment a counter or otherwise log the number of executions of a query each time the query is executed.

Execution data 134 can also include query status statistics for each query execution and each type of process. For example, each query may be configured (either by default or through additional modifications or instrumentations as described above) to produce messages or alerts that indicate query execution status. For example, execution data 134 can include query status statistics that indicate successful or failed execution, or whether the execution satisfied or failed to satisfy expected execution time thresholds, or the like.

In an embodiment, data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, data repository 130 may be implemented or may execute on the same computing system as one or more other components of the system 100. Alternatively or additionally, data repository 130 may be implemented or executed on a computing system separate from one or more other components of the system 100. Data repository 130 may be communicatively coupled to one or more other components of the system 100 via a direct connection or via a network.

In an embodiment, sampling agent 104 includes sampling management engine 106. Sampling management engine 106 includes sampling component 108 and reporting component 112. Sampling management engine 106 may be configured to manage a process of sampling queries that are being executed by, for example, execution engine 124.

Generally, sampling component 108 may be configured to determine or detect which queries are executing (e.g., during a sampling interval or sampling point in time) and obtain query execution statistics for those queries. In an embodiment, sampling component 108 may be configured to determine which queries, if any, are executing at a certain time, such as during a sampling interval (e.g., ten seconds). Sampling component 108 may be configured to identify the query that was executing during the sampling interval using some query identifier(s). As described above, other queries may share one or more similarity criteria or share some representative characteristic with the query that is executing during the sampling interval. These other queries may be considered related queries as described above. Sampling component 108 may be configured to obtain query execution statistics for the query executing during the sampling interval and any related queries. In an embodiment, sampling component 108 may be configured to obtain query execution statistics corresponding to the query and related queries for executions taking place during a period of time that is different from the sampling interval. This period of time may be referred to herein as a monitoring window. The monitoring window may be a predefined time period. The monitoring window may span one or more intervening periods between the current sampling interval and one or more prior sampling intervals.

As used herein, the term "sampling interval" may refer to a period of time or even a point in time as determined by sampling component 108. For example, a certain query, query A, may be executing for a certain period of time, such as three minutes. The query execution may, for example, start at 10:00:00 AM and end at 10:03:00 AM. However, sampling component 108 may be configured to determine what queries are executing during a sampling interval which spans the time from 10:01:00 AM to 10:01:10 AM, or a sampling interval of ten seconds. Alternatively, sampling component 108 may be configured to determine what queries are executing at a sampling interval point in time of 10:01:05 AM. If the sampling interval intersects with or coincides with the query execution period of query A, sampling component 108 may be configured to determine that query A was executing during the sampling interval. As a result of that determination, sampling component 108 may obtain query execution statistics for query A.

In an embodiment, sampling component 108 may be configured to repeatedly detect which queries are executing. Sampling component 108 may be configured to inspect traffic between different computing devices or components. For example, one computing component, node, or device, such as an application processing component, may retrieve data from another computing component, node, or device, such as a database component. The data retrieval may be performed using a query having certain instructions as described above. The data retrieval process may involve the application processing component sending data packets representing the query to the database component. The database component may respond to the query by sending data packets representing the requested data to the application processing component. As noted above, this process takes place over a period of time. If the sampling interval intersects with or coincides with this period of time, sampling component 108 may, for example, inspect or review the packets being sent. Sampling component 108 may or may not inspect the precise contents of each data packet.

Sampling component 108 may consider various combinations of the below conditions or conditions or states to determine that a query is currently being executed. For example, sampling component 108 may consider that a query is executing once a computing component begins transmitting a query to a recipient computing component (e.g., a database component). If a query has been transmitted and a response has not yet completed transmission, the query may be considered to be currently executing. If a response to the query has been received (e.g., a database component sending the requested data or a confirmation of database changes) and/or acknowledged, the query may be considered to have completed execution. A component may issue log messages that sampling component 108 can monitor to determine query execution status. Generally, any condition or state of a computing component or computer data can be monitored, reviewed, or inspected by sampling component 108 to determine the execution status of a query or other process.

Sampling component 108 may determine which queries are executing in a periodic manner, according to a particular schedule, or in response to an external instruction (e.g., in response to a message received from sample processing server 122). In other words, the sampling process may repeat sampling during the sampling interval periodically or as defined by sampling requirements. For example, sampling component 108 may detect execution of queries once every minute. In other words, once every minute, sampling component 108 may detect which queries are executing during a particular sampling interval, such as ten seconds. With a once per minute sampling, and a sampling interval lasting ten seconds, a time period of fifty seconds may elapse between the end of one sampling interval and the start of another sampling interval. Continuing with the example above, a sampling interval may span the time from 10:01:00 AM to 10:01:10 AM, then from 10:02:00 AM to 10:02:10 AM, then from 10:03:00 AM to 10:03:10 AM, and so on. Sampling component 108 may be configured to detect which queries are executing during each of the abovementioned sampling intervals. A query may execute zero, one or more times during each sampling interval. A single query execution may span across multiple sampling intervals. In an embodiment, sampling component 108 may be configured to register individual executions of a query during each sampling interval, even if it is the same execution that spanned across multiple sampling intervals. In another embodiment, sampling component 108 may be configured to distinguish between individual executions of each query. In other words, a query whose execution spans multiple sampling intervals is treated as a single query execution by sampling component 108.

In an embodiment, a monitoring window may be defined in relation to a corresponding sampling interval. For example, a monitoring window may be defined as a time period spanning ten minutes immediately preceding a particular sampling interval. The monitoring window may be equivalent to a time period between a current sampling interval and a prior sampling interval immediately before the current sampling interval. In another embodiment, the monitoring window may span a period of time between the current sampling interval and a sampling interval that is some number of sampling intervals prior to the current sampling interval. For example, consider five consecutive sampling intervals A, B, C, D, and E, with E being the current sampling interval. In this example, the monitoring window corresponding to sampling interval E may span a period of time between sampling intervals A and E inclusive, or B and E inclusive, or C and E inclusive, and so on. Relatedly, the monitoring window may span the intervening periods of time between sampling intervals A and D, or B and C, and so on.

In an embodiment, sampling component 108 may be configured to identify the query that is currently executing using some representative characteristic of the query. As described above, a query may be identifiable in different ways. Sampling component 108 may identify a query using, for example, a query identifier. The query identifier may, in some embodiments, be a representation of one or more characteristics of the query. For example, as described above, a function such as a hash function may generate a hash value of characteristics of the query. The hash function may generate a hash value of all of the instructions that make up the query. The hash function may also be used to generate a hash value for only a specific portion of the query. For example, the query may include a method or set of instructions that perform the key functions of the query or are otherwise considered essential or representative functions of the query. The hash function may be configured to generate hash values for the abovementioned key method or set of instructions. The hash value may be used as the query identifier for the query.

As described above, sampling component 108 may be configured to identify related queries to the query that is currently executing. In one embodiment, sampling component 108 may identify related queries based on the query identifier. In other words, two queries having the same query identifier (e.g., the same hash function result) may be considered to be related queries. As mentioned above, two different queries may have different characteristics or even different behavior. However, the two different queries may have a similar representative characteristic. For instance, when the hash function generates hash values for the two different queries, the same hash value may result for the two different queries. As a result, sampling component 108 may be configured to consider the two different queries as related queries. Accordingly, if one of the two different queries is executing during the sampling interval and another of the two different queries executed prior to the sampling interval, sampling component 108 may be configured to consider the two different queries as being part of a plurality of related queries.

Sampling component 108 may obtain query execution statistics that are generated from query executions performed by, for example, execution engine 124. As described above, multiple queries may be executing at any given time in a continuing stream. In one embodiment, query execution statistics may be generated for each query that is executed. These query execution statistics may be available in buffer 140, described in greater detail below. In an alternative embodiment, described further below, sampling component 108 may be configured to generate statistics for each query that sampling component 108 identifies during the sampling process (e.g., by generating query execution statistics for each detected query and storing them in data repository 130 and/or transmitting them to sample processing server 122).

In an embodiment, sampling component 108 may be configured to obtain query execution statistics corresponding to a query executing during a sampling interval. In addition, sampling component 108 may be configured to obtain query execution statistics for any related queries that were executing during the sampling interval and during a monitoring window prior to the sampling interval. As described above, a monitoring window may span a period of time prior to the sampling interval that encompasses one or more intervening periods between sampling intervals. For example, the monitoring window may span the period of time that includes a first intervening period between a current sampling interval E and an immediately prior sampling interval D and a second intervening period between the immediately prior sampling interval D and a next prior sampling interval C that occurred before sampling interval D.

Continuing with the above example, sampling component 108 may be configured to obtain query execution statistics corresponding to a query if it is executing during the current sampling interval. More specifically, sampling component 108 may obtain query execution statistics corresponding to the executing query for executions of that query during the monitoring window prior to the current sampling interval. Additionally or alternatively, sampling component 108 may be configured to obtain query execution statistics for any related queries (related to the query that executed in the sampling interval) that executed during the monitoring window prior to the current sampling interval.

In an embodiment, sampling component 108 may be configured to retrieve and/or maintain query data for all known queries or processes. For example, this query data may be maintained in query data 132. As described above, query data 132 may include query identifiers for all known queries. For example, query data 132 may include hash values or results of a hash function as applied to some or all of the characteristics of all known queries. Sampling component 108 may be configured to retrieve each query identifier for each query. Sampling component 108 may be configured to compare hash values of each query that was executing during a sampling interval with the hash values of all known queries. As a result, sampling component 108 may compare the list of currently executing queries (e.g., that executed during the current sampling interval) with the list of known queries (e.g., maintained in query data 132) and determine the list of non-executing queries (e.g. those that did not execute during the current sampling interval).

In an embodiment, sampling component 108 may be configured to obtain query execution statistics for a first plurality of queries. The first plurality of queries includes a currently executing query that is executing during the current sampling interval and any related queries related to the currently executing query. The query execution statistics correspond to executions of the first plurality of queries during a monitoring window (e.g., some period of time prior to the current sampling interval). As described above, the monitoring window may comprise a first intervening period between the current sampling interval and another sampling interval that may be the immediately prior sampling interval or may comprise the first intervening period and a second intervening period between the last sampling interval and the second-to-last sampling interval. The monitoring window may comprise several intervening periods spanning a time between the current sampling interval and a sampling interval that was several sampling intervals prior to the current sampling interval.

As an example, sampling component 108 may be configured to obtain query execution statistics for a currently executing query corresponding to a first intervening period between a current sampling interval and the last sampling interval before the current sampling interval. In other words, sampling component 108 may be configured to "reach back" at least into a prior intervening period between the last sampling interval and the second-to-last sampling interval and/or additional intervening periods prior to the prior intervening period.

Sampling component 108 may be configured to refrain from obtaining query execution statistics for a second plurality of queries. The second plurality of queries includes any query that did not execute during the current sampling interval and any related queries related to any query that did not execute during the current sampling interval. Accordingly, sampling component may be configured to refrain from obtaining query execution statistics during the monitoring window for the second plurality of queries.

In an embodiment, query execution statistics are generated and stored for query executions for the monitoring window in buffer 140. Buffer 140 may be any temporary data structure configured to store query execution statistics. In an embodiment, query execution statistics are generated each time a query is executed. For example, an execution counter may be incremented for each query each time the query is executed and the counter may be stored in buffer 140 and identified by, for example, a query identifier for the query. Similarly, query start and end times may be recorded for each execution of a query in buffer 140 with respect to the executing query. The start and end times may be used to calculate a total query execution time. These query execution statistics are stored in buffer 140 corresponding to a particular monitoring window. As time moves on, the monitoring window will shift forward as well. For example, a monitoring window may span two intervening periods R-S and S-T between three sampling intervals R, S, and T, with the current sampling interval T being the last of these three. As time moves forward, it will be time for a new sampling interval U. At the new sampling interval U, the monitoring window may now comprise the two intervening periods S-T and T-U between the three sampling intervals S, T, and U, with the new sampling interval U being the last of the three. In an embodiment, data for query execution statistics in buffer 140 may be reset each time the monitoring window shifts forward. In other words, query execution statistics for a first monitoring window are deleted and replaced with query execution statistics corresponding to executions taking place in a new, second monitoring window.

In an embodiment, sampling component 108 may be configured to retrieve query execution statistics from buffer 140, identify queries that executed during the sampling interval and obtains query execution statistics for those queries and related queries that executed during the monitoring window. As described above, buffer 140 may store query execution statistics for each query that executes during the monitoring window. Accordingly, sampling component 108 may access buffer 140 and retrieve query execution statistics for all query executions stored in buffer 140. Of all of those query executions, sampling component 108 obtains query execution statistics for those queries that executed during the sampling interval and for any related queries that executed during the monitoring window. Sampling component 108 may refrain from obtaining, from buffer 140, query execution statistics for queries (and for their related queries) that did not execute during the sampling interval.

In an alternative embodiment, sampling component 108 may be configured to generate query execution statistics based on execution data being generated for query executions during the monitoring window. For example, execution engine 124 may execute queries. Query execution may involve loading queries for execution into a working memory used by execution engine 124, such as memory 125. For example, execution engine 124 may be a virtual machine that uses a virtual machine memory to execute queries. The virtual machine memory may be accessible via one or more APIs of the virtual machine. Sampling component 108 may be configured to search memory 125 or other working memory of execution engine 124 to identify related queries and generate query execution statistics for the plurality of queries that includes the currently executing query and any related queries.

For example, sampling component 108 may be configured to detect a query that is executing during a current sampling interval. Sampling component 108 may determine a representative value, such as a hash value, for the currently executing query. Sampling component 108 may be configured to search memory 125 of execution engine 124 for any related queries using the hash value that executed during the monitoring window. For instance, sampling component 108 may compare the hash value to the hash value for each query that executed during the monitoring window prior to the current sampling interval. Sampling component 108 may determine that, for example, a query of hash value A123 executed during the current sampling interval. Sampling component 108 may be configured to identify a particular plurality of queries using the hash value. For example, the particular plurality of queries may include the currently executing query and any related queries. The related queries may be identified by determining whether any other query executed during the monitoring window has the same hash value of A123.

For any related queries that match the hash value of A123, sampling component 108 may be configured to generate query execution statistics. For example, sampling component 108 may determine that queries with a hash value of A123 executed a specific number of times. Sampling component 108 may be configured to count the number of times and generate a query execution count for that plurality of queries. Similarly, sampling component 108 may generate additional query execution statistics pertaining to query execution start time, end time, elapsed time, CPU usage time, network resource usage time, and any other statistics that correspond to the plurality of queries that includes the currently executing query and any related queries.

As described above, sampling component 108 may identify that certain queries executed during the monitoring window but do not match the hash value of the currently executing query. For example, a particular query may be loaded into memory and may execute during the monitoring window. This particular query may have a hash value of C509 and may have executed during the monitoring window but may not have executed during the current sampling interval. This query does not match the query that did execute during the sampling interval and had a hash value of A123. Accordingly, sampling component 108 may be configured to not generate any query execution statistics for the query having the hash value of C509.

In an embodiment, reporting component 112 may be configured to report query execution statistics. As used herein, reporting may refer to storage (e.g., into permanent data storage) of query execution statistics and/or transmission of query execution statistics. In an embodiment, reporting component 112 may be configured to receive query execution statistics that are retrieved or generated by sampling component 108. Reporting component 112 may be configured to store the received query execution statistics in data storage (e.g., in execution data 134). Reporting component 112 may also be configured to transmit the received query execution statistics to, for example, sample processing server 122.

System 100 includes sample processing server 122. Sample processing server 122 may be a computing device that is separate from computing device 102. Sample processing server 122 may be configured to request query execution statistics from computing device 102 (e.g., from sampling agent 104). In an embodiment, sample processing server 122 may be configured to perform various operations with respect to the received query execution statistics. For example, sample processing server 122 may be configured to remove duplicate query execution statistics. In an embodiment, sampling agent 104 (or sampling component 108) may only provide query start and end times for a query execution. Sample processing server 122 may be configured to calculate query execution times from the provided query start and end times.

In an embodiment, sampling agent 104 includes sampling execution interface 102, which may refer to hardware and/or software configured to facilitate communications between system 100 and a user or other computing device. For example, the user may be performing a sampling process that includes requesting query execution statistics for one or more queries executing on computing device 102. Sampling execution interface 102 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of sampling execution interface 102 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, sampling execution interface 102 is specified in one or more other languages, such as Java, C, or C++.

In an embodiment, sampling execution interface 102 may include various types of interface elements that the above-mentioned user may interact with. For example, sampling execution interface 102 can include configuration elements 116, request processing elements 118, and reporting elements 120.

In an embodiment, configuration elements 108 include user interface elements that the user can interact with to configure the sampling process. For example, a user can use configuration elements 104 to specify details of the sampling interval to be used. The user may use configuration elements 108 to define, for example, the duration of the sampling interval and the sampling interval frequency. The user can use configuration elements 104 to define a monitoring window prior to the sampling interval. For example, the monitoring window may be a period of time within which one or more related queries are executed that are related to a query that is executing during a sampling interval.

In an embodiment, request processing elements 110 can include user interface elements that can present, to the user, one or more attributes or characteristics of query execution. For example, request processing elements 110 can include user interface elements that present details of queries that are currently executing. Reporting elements 120 can include user interface elements that can present or communicate query execution statistics. For instance, reporting elements 120 may present, for example, charts or graphs that graphically depict query execution statistics.

In an embodiment, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Query Execution Data Sampling

Figure 2:
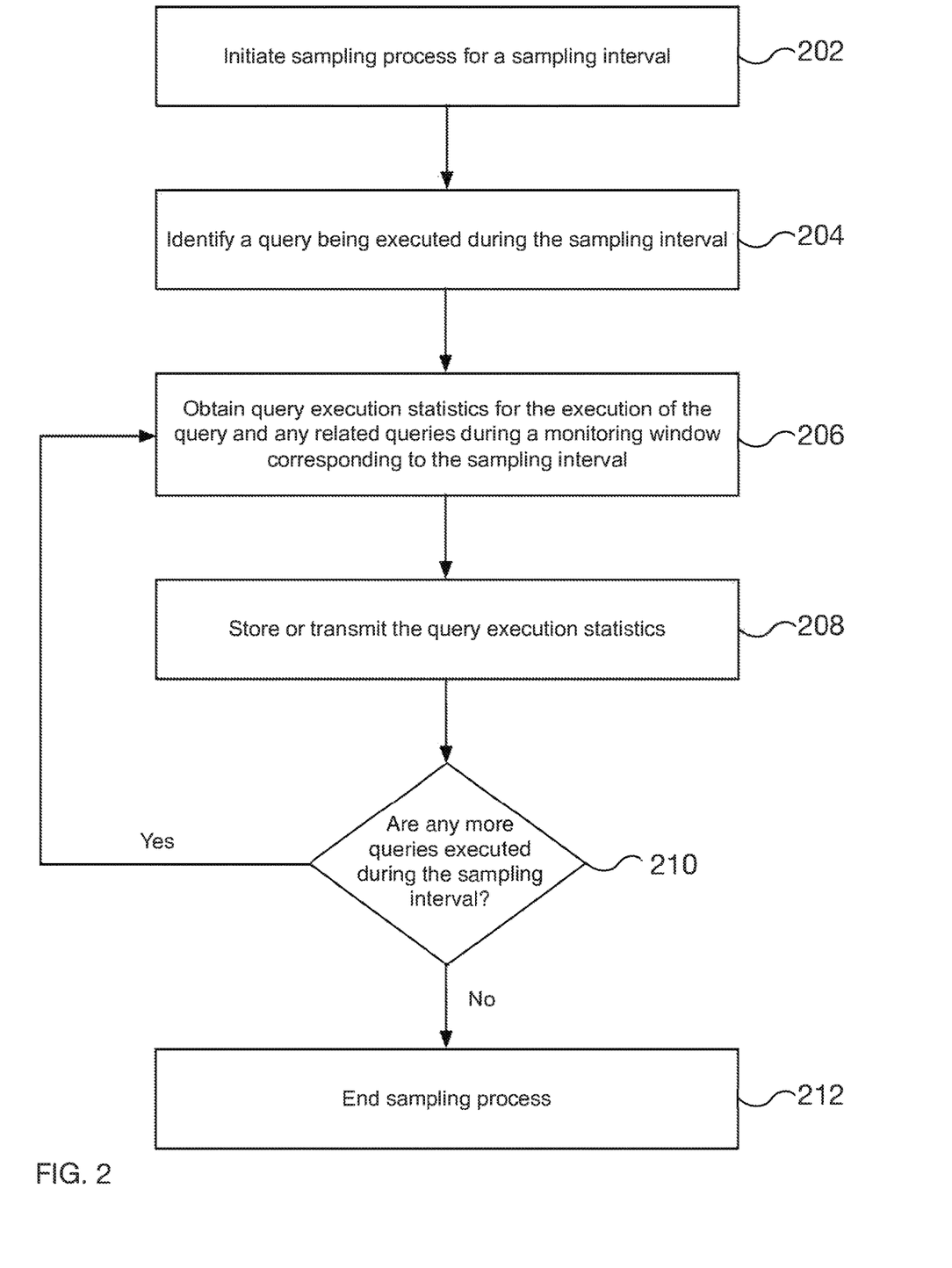
FIG. 2 shows a set of operations for query execution data sampling in accordance with one or more embodiments.

FIG. 2 illustrates an example set of operations for query execution data sampling in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments. As an example, sampling component 108 (shown in FIG. 1) may be configured to perform one or more operations of the process of FIG. 2.

In an embodiment, sampling component 108 may be configured to initiate a sampling process (Operation 202). As an example, sampling component 108 may receive an instruction (e.g., from a user or from sample processing server 122) to perform a sampling of the current query executions being performed by, for example, execution engine 124. Sampling component 108 may receive a simple instruction to initiate sampling based on predefined parameters. For example, sampling parameters such as the sampling interval to use and the length of the monitoring window may be predetermined. Alternatively, sampling component 108 may receive more detailed instructions when being instructed to initiate sampling. For example, a user may define the sampling interval, the monitoring window, and/or the specific queries to sample when instructing sampling component 108 to begin sampling executions.

As a result of the instruction to initiate sampling, sampling component 108 may be configured to request execution engine 124, buffer 140, and/or data repository 130 to provide details of current executions. As a more specific example, sampling component 108 may request execution engine 124 to provide all computing threads that are actively processing. Sampling component 108 may be configured to request execution details from each active thread to determine currently executing queries.

In an embodiment, sampling component 108 may be configured to identify a query that is being executed during a sampling interval (Operation 204). As described above, query execution statistics may be stored in buffer 140. Additionally or alternatively, sampling component 108 may identify currently executing queries (e.g., from memory 125) and generate query execution statistics. Where query execution statistics are known to be stored in a buffer (e.g., buffer 140), sampling component 108 may be configured to identify each query stored in the buffer and retrieve query execution statistics for each identified query.

In an embodiment where query execution statistics are not known to be stored in a buffer, sampling component 108 may be configured to access all active processing threads. For each active thread, sampling component 108 may identify the query that is executing on that thread. Sampling component 108 may repeat the query identification process for all threads that are executing during a particular sampling interval. As described above, a sampling interval may be a relatively short period of time (e.g., a fraction of a second). Within the sampling interval, sampling component 108 may identify that multiple queries are executing. For each query executing during the sampling interval, sampling component 108 may determine its identifier, such as a hash value of some characteristics of the query. Sampling component 108 may be configured to determine hash values for all queries that are executing during the sampling interval.

In an embodiment, sampling component 108 may be configured to obtain query execution statistics for the execution of the query and any related queries during a monitoring window corresponding to the sampling interval (Operation 206). For example, sampling component 108 may use hash values determined for each query that is executing during the sampling interval to search for any related queries. As described above, any related queries may have the same representative characteristics as the currently executing query. Sampling component 108 may be configured to search memory 125 for all executions of the plurality of queries that includes the currently executed query and all related queries. Sampling component 108 may generate query execution statistics for the plurality of queries. For example, sampling component 108 may create an execution count variable and increment the execution count variable for each execution of any of the plurality of queries. Sampling component 108 may create execution start time, end time, and elapsed time variables and generate query execution statistics corresponding to each of these variables.

As described above, sampling component 108 may be configured to obtain query execution statistics for the plurality of queries (i.e., the currently executing query and any related queries) during a particular monitoring window. The monitoring window may be a defined period of time. The monitoring window may be defined when a user requests to initiate sampling as in Operation 202. The monitoring window may be an aggregation of multiple intervening periods between multiple sampling intervals prior to and/or including the current sampling interval. Accordingly, once sampling component 108 has identified currently executing queries, sampling component 108 may be configured to identify all related queries that executed during the monitoring window. Sampling component 108 may generate or otherwise obtain query execution statistics for each of the plurality of queries (the currently executing query and any related queries) for a time period defined by the monitoring window.

As described above with respect to the monitoring window, sampling component 108 may be configured to generate or otherwise obtain query execution statistics for a currently executing query (and related queries) for a current intervening period between the current sampling interval and the prior most recent (i.e., last) sampling interval. Sampling component 108 may also be configured to "reach back" and generate or otherwise obtain query execution statistics for the currently executing query (and related queries) for a previous intervening period between, for example, the prior most recent sampling interval and an even earlier sampling interval (e.g., the second to last or third to last sampling interval) that occurred before the prior most recent sampling interval.

Additionally, sampling component 108 may be configured to generate or otherwise obtain query execution statistics only for a plurality of queries that includes a query that is executing during a current sampling interval. For example, sampling component 108 may generate or obtain query execution statistics for a first plurality of queries that includes a query that is executing during a current sampling interval but may not generate or obtain query execution statistics for a second plurality of queries that does not include a query that is executing during a current sampling interval. For this second plurality of queries, there may be queries that execute during the monitoring window but none of the second plurality of queries may have executed during the sampling interval. Since monitoring windows may overlap, one of the second plurality of queries may execute during a future sampling interval. If so, sampling component 108 may generate or obtain query execution statistics for any of the second plurality of queries that are still within the new monitoring window, as described below in further detail with respect to FIGS. 3 and 4.

In an embodiment, sampling component 108 may be configured to store or transmit the query execution statistics (Operation 208). As described above with respect to FIG. 1, sampling component 108 may retrieve query execution statistics from, for example, buffer 140. Additionally or alternatively, sampling component 108 may generate query execution statistics by accessing query executions from memory 125. Sampling component 108 may store these query execution statistics in, for example, data repository 130 or some remote storage (not shown). Additionally or alternatively, sampling component 108 may transmit the query execution statistics to sample processing server 122.

In an embodiment, sampling component 108 may be configured to perform operation 206 for each query executing during the sampling interval. As query execution statistics are processed for each such query, sampling component 108 may be configured to determine if there are any more queries that executed during the sampling interval (Operation 210). For example, sampling component 108 may determine that a first query with a hash value of A123 executed during the sampling interval. Sampling component 108 may then generate or otherwise obtain query execution statistics for the first query and any related queries (having the hash value of A123) for all executions for these queries during the monitoring window. Similarly, sampling component 108 may also determine that a second query with a hash value of B456 executed during the sampling interval. Accordingly, sampling component 108 may generate or otherwise obtain query execution statistics for the second query and any related queries (having the hash value of B456) for all executions for these queries during the monitoring window. The process may be repeated for all queries that executed during the sampling interval. If, at operation 210, sampling component 108 determines that no more queries remain that executed during the sampling interval, sampling component 108 may be configured to end the sampling process (Operation 212).

4. Illustrative Example

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3:
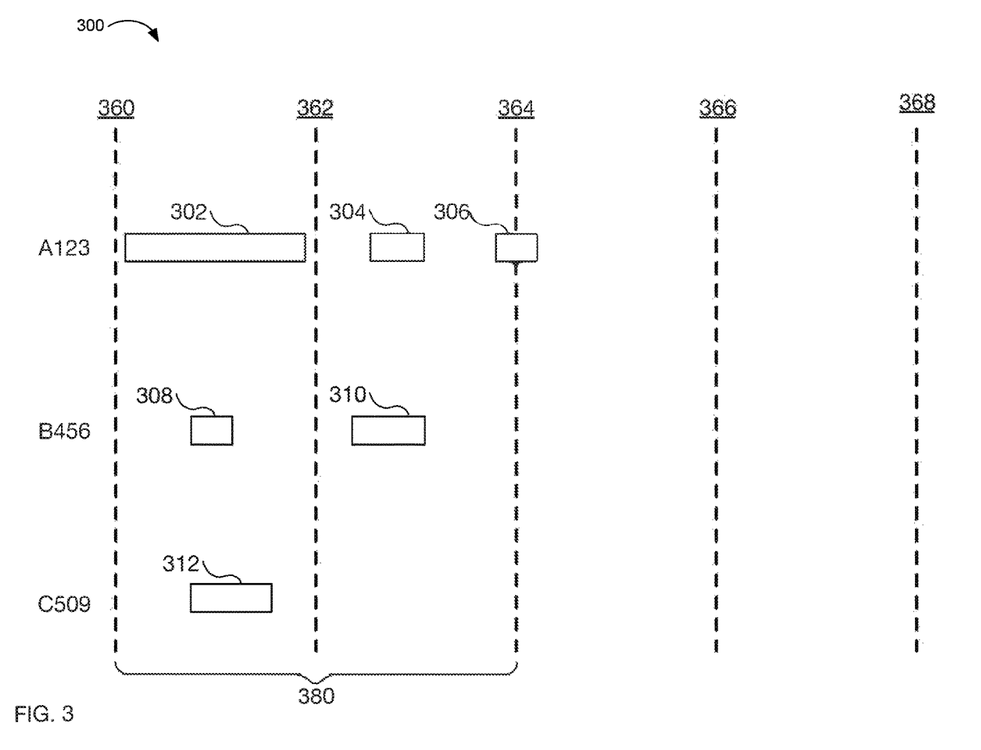
FIG. 3 shows an example of a query execution data sampling process in accordance with one or more embodiments.

FIG. 3 shows an illustrative example of a query execution data sampling process according to the disclosed embodiments. FIG. 3 shows a first execution state 300. In an embodiment, execution state 300 shows a visualization of a number of queries undergoing execution. Specifically, execution state 300 illustrates queries 302, 304, 306, 308, 310, and 312. Execution state 300 also shows multiple sampling intervals 360, 362, 364, 366, and 368. Execution state 300 illustrates that query executions may coincide with a current sampling interval. For execution state 300, the current sampling interval is sampling interval 364. As shown, the execution of query 306 coincides with current sampling interval 364. Accordingly, sampling component 108 may be configured to detect that query 306 is executing during sampling interval 364.

Execution state 300 also shows monitoring window 380. As described above, a monitoring window may span one or more intervening periods between multiple sampling intervals. As shown in FIG. 3, monitoring window 380 extends from sampling interval 360, through a first intervening period between sampling interval 360 and sampling interval 362, and also through a second intervening period between sampling interval 362 and current sampling interval 364.

In an embodiment, sampling component 108 may be configured to generate or obtain query execution statistics for a query executing during current sampling interval 364 and any related queries that executed during monitoring window 380. In the example embodiment, other queries may execute during monitoring window 380. But sampling component 108 may refrain from generating or obtaining query execution statistics for these other queries if there is no query related to these other queries that executed during sampling interval 364.

As shown, query 306 is executing during sampling interval 364. Accordingly, sampling component 108 may be configured to identify query 306. For example, query 306 may be identifiable by its hash value of A123, as shown. Sampling component 108 may be configured to generate or obtain, for all related queries having hash value A123, query execution statistics for executions during monitoring window 380. As shown in FIG. 3, in addition to query 306, query 302 and query 304 also have hash value A123. Query 302 and query 304 may represent executions of the exact same query as that executing at sampling interval 364 and represented by query 306. Alternatively, query 302 and query 304 may have characteristics that differ from query 306 but may have the same representative characteristics as query 306. For example, query 302 and query 304 may have the same key characteristics or instructions as query 306. As a result, query 302 and query 304 may have the same hash value of A123 as query 306. Sampling component 108 may not generate or obtain query execution statistics for queries 308, 310, and 312, for example, because queries 308, 310, and 312 did not have a hash value that matched that of query 306 (i.e., A123).

Continuing with the example above, sampling component 108 may be configured to generate or obtain query execution statistics for query 302, query 304, and query 306 at sampling interval 364, because query 306 was executing at sampling interval 364. Accordingly, sampling component 108 may generate or obtain, for example, a query execution count of 3 representing the count of queries 302, 304, and 306. Sampling component 108 may generate or obtain query execution times for each of queries 302, 304, and 306. Note that query 302 is shown as having a significantly longer execution time than that of query 306. Both query 302 and query 306 are treated as being related. However, a user may review the query execution statistics for these queries and investigate why query 302 took a significantly longer time than query 306 even though both queries share the same key methods. A user may determine, for example, that query 302 includes inefficient or unnecessary instructions that may be modified or removed.

Figure 4:
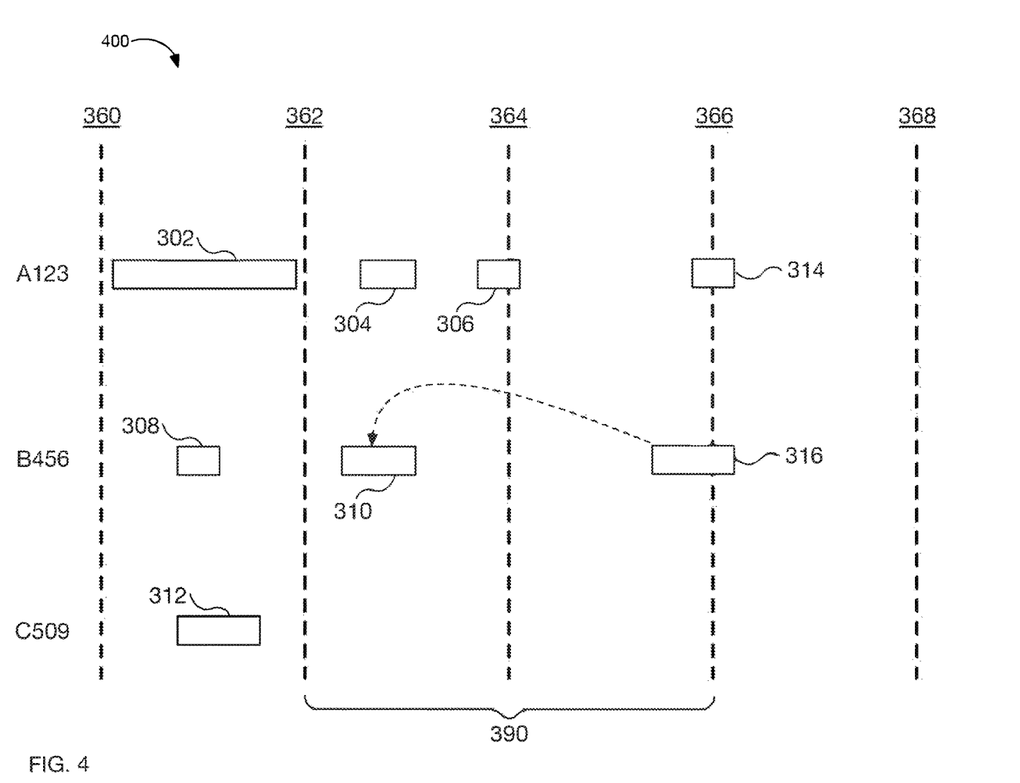
FIG. 4 shows another example of a query execution data sampling process in accordance with one or more embodiments.

FIG. 4 shows another illustrative example of a query execution data sampling process according to the disclosed embodiments. FIG. 4 shows a second execution state 400. In an embodiment, execution state 400 shows a visualization of a number of queries undergoing execution. Specifically, execution state 400 illustrates queries 302, 304, 306, 308, 310, 312, 314, and 316. Execution state 400 also shows multiple sampling intervals 360, 362, 364, 366, and 368 as were shown in FIG. 3. Execution state 400 also illustrates that query executions are coinciding with the current sampling interval. The current sampling interval is now sampling interval 366. As shown, the execution of query 314 and query 316 coincides with sampling interval 364. Accordingly, sampling component 108 may be configured to detect that query 314 and query 316 is executing during current sampling interval 366.

Execution state 400 also shows monitoring window 390. As described above, a monitoring window may span one or more intervening periods between multiple sampling intervals. As shown in FIG. 4, monitoring window 390 extends from sampling interval 362, through the second intervening period between sampling interval 362 and sampling interval 364, and also through a third intervening period between sampling interval 364 and current sampling interval 366.

As shown, query 314 is executing at sampling interval 366. Sampling component 108 may be configured to generate or obtain query execution statistics for related queries 302, 304, and 306 along with query 314, because they all hash to the same value and executed during monitoring window 390. Alternatively, sampling component 108 may be configured to determine that query execution statistics were already generated or obtained and then stored or transmitted for queries 302, 304, and 306. Sampling component 108 may store or transmit query execution statistics for query 314 and decline to store or transmit duplicative data for queries 302, 304, and 306.

Sampling component 108 may identify that query 316 is executing during sampling interval 366. In response to the identification, sampling component 108 may generate or obtain query execution statistics for query 316 and any related queries that executed during the monitoring window. Accordingly, sampling component 108 may generate or obtain query execution statistics for query 310, because query 310 hashed to the same value as query 316 (i.e., B456). Accordingly, sampling component 108 "reaches back" behind sampling interval 364, determines that query 310 executed within monitoring window 390 and hashed to the same value as a currently executing query (query 316), and generates or obtains query execution statistics pertaining to query 310.

By comparison, sampling component 108 may not generate or obtain query execution statistics for query 308. Even though query 308 has the same hash value as query 316 (i.e., B456), query 308 executed outside monitoring window 390. Query 308 is thus not considered by sampling component 108 for purposes of generating or obtaining query execution statistics. In other words, query 308 satisfied some but not all conditions for purposes of query execution statistics.

As another point of comparison, query 312 may also not be considered for purposes of generating or obtaining query execution statistics. Referring back to FIG. 3, query 312 did execute within a monitoring window (i.e., monitoring window 380). However, query 312 has a hash value of C509. No query matching hash value C509 was executed at sampling interval 364 or sampling interval 366. As a result, query 312 is not a related query for any query that executed during a sampling interval. Accordingly, query 312 is a query whose statistics are not included by sampling component 108 with respect to the examples provided in FIGS. 3 and 4.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
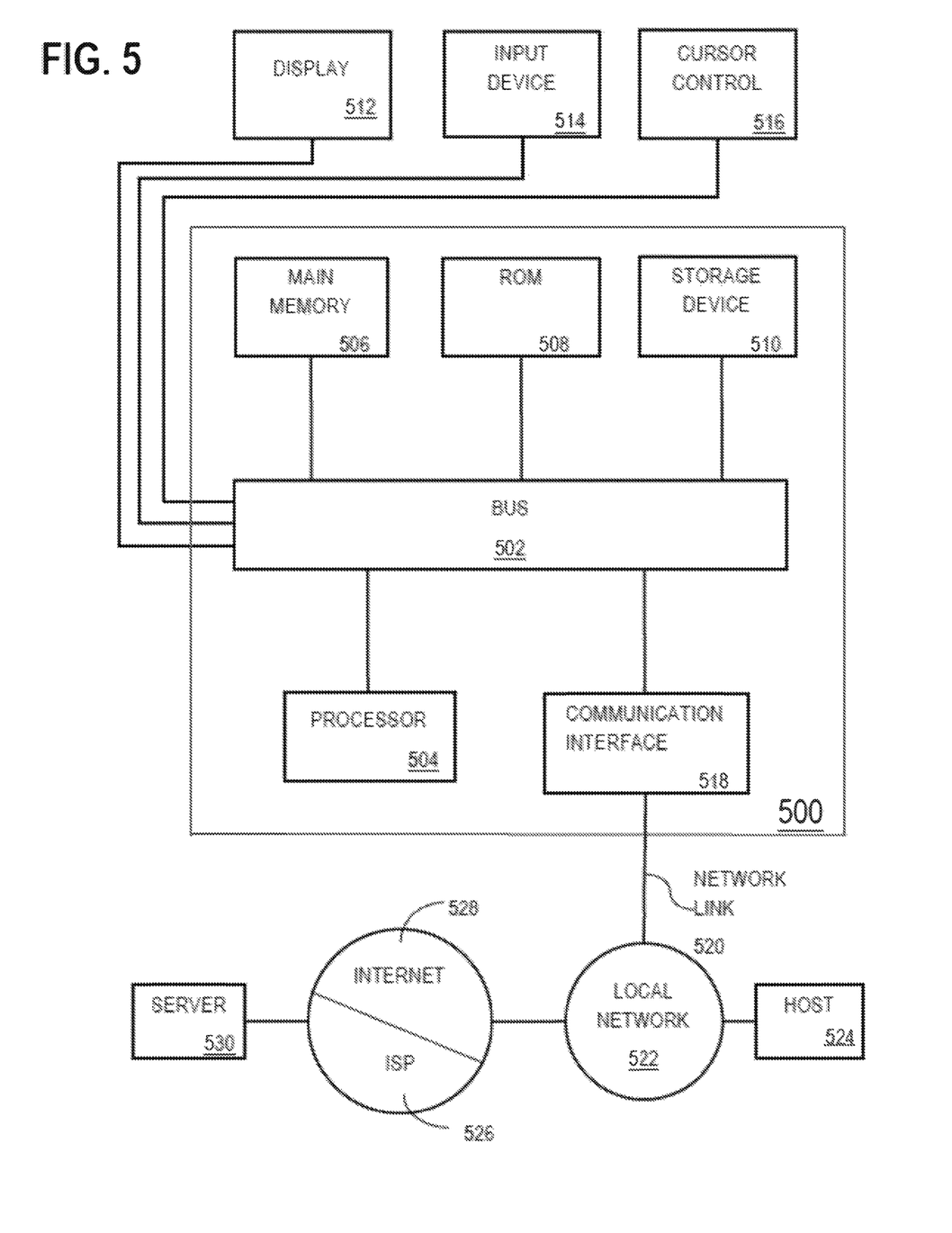
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), plasma display, electronic ink display, cathode ray tube (CRT) monitor, or any other kind of device for displaying information to a computer user. An input device 514, including alphanumeric and other keys, may be coupled to bus 502 for communicating information and command selections to processor 504. Alternatively or in addition, the computer system 500 may receive user input via a cursor control 516, such as a mouse, a trackball, a trackpad, a touchscreen, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. The display 512 may be configured to receive user input via one or more pressure-sensitive sensors, multi-touch sensors, and/or gesture sensors. Alternatively or in addition, the computer system 500 may receive user input via a microphone, video camera, and/or some other kind of user input device (not shown).

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 500 can receive the data from the network and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    identifying a first monitoring window, wherein:
        at least one of a first plurality of related queries is executed during the first monitoring window,
        the first plurality of related queries comprise queries sharing a first query characteristic,
        at least one of a second plurality of related queries is executed during the first monitoring window, and
        the second plurality of related queries comprise queries sharing a second query characteristic;
    executing a first sampling operation to sample queries executing in a first sampling interval of a plurality of sampling intervals, the first sampling interval comprised in a portion of time in the first monitoring window;
    based on the first sampling operation: determining that a first query, of a first plurality of related queries, executed during the first sampling interval comprised in the first monitoring window;
    responsive to determining that the first query executed during the first sampling interval:
        identifying a first set of query execution statistics corresponding to execution of the first plurality of related queries during the first monitoring window;
        storing or transmitting the first set of query execution statistics (a) corresponding to execution of the first plurality of related queries and (b) identified based on the first sampling operation;
    based on the first sampling operation: determining that none of a second plurality of related queries executed during the first sampling interval comprised in the first monitoring window; and
    responsive to determining that none of the second plurality of related queries executed during the first sampling interval: refraining from storing or transmitting, based on the first sampling operation, any query execution statistics corresponding to the second plurality of related queries during the first monitoring window.

2. The non-transitory computer readable medium of claim 1, wherein the first plurality of related queries comprises queries that meet a similarity criteria.

3. The non-transitory computer readable medium of claim 1, wherein the first plurality of related queries comprises queries that, when applied to a hash function, result in a same hash value.

4. The non-transitory computer readable medium of claim 1, wherein the first plurality of related queries comprises queries that require a same set of resources for execution.

5. The non-transitory computer readable medium of claim 1, wherein the query execution statistics are identified based on information that is temporarily stored in a buffer associated with the first monitoring window.

6. The non-transitory computer readable medium of claim 1, further comprising storing or transmitting the query execution statistics in association with a first time period that is between the first sampling interval and a second sampling interval that is prior to the first sampling interval.

7. The non-transitory computer readable medium of claim 1, wherein the first monitoring window includes a first time period and a second time period that is between the second sampling interval and a third sampling interval that is prior to the second sampling interval.

8. The non-transitory computer readable medium of claim 1, wherein the operations further comprise periodically or continuously updating a buffer based on the queries executing during a current monitoring window.

9. A non-transitory computer readable medium comprising instructions which, when executed by one or more hardware processors, causes performance of operations comprising:
    determining that a first query, of a plurality of related queries, is executing during a first sampling interval of a plurality of sampling intervals;
    responsive to determining that the first query is executing during the first sampling interval, identifying query execution statistics corresponding to execution of the plurality of related queries during a first monitoring window that is associated with first sampling interval, wherein the first monitoring window spans across a time period that includes multiple sampling intervals of the plurality of sampling intervals;
    wherein the query execution statistics correspond to the execution of at least:
        (a) the first query, the first query being initiated between the first sampling interval and a second sampling interval, of the plurality of sampling intervals, that is prior to the first sampling interval; and
        (b) a second query of the plurality of related queries, the second query being initiated between the second sampling interval and a third sampling interval, of the plurality of sampling intervals, that is prior to the second sampling interval;
    storing or transmitting the query execution statistics in association with the first sampling interval.

10. A system comprising:
    at least one device including a hardware processor;
    the system being configured to perform operations comprising:
        identifying a first monitoring window, wherein:
            at least one of a first plurality of related queries is executed during the first monitoring window,
            the first plurality of related queries comprise queries sharing a first query characteristic,
            at least one of a second plurality of related queries is executed during the first monitoring window,
            the second plurality of related queries comprise queries sharing a second query characteristic;

executing a first sampling operation to sample queries executing in a first sampling interval of a plurality of sampling intervals, the first sampling interval comprised in a portion of time in the first monitoring window;

based on the first sampling operation: determining that a first query, of a first plurality of related queries, executed during the first sampling interval comprised in the first monitoring window;

responsive to determining that the first query executed during the first sampling interval:
identifying a first set of query execution statistics corresponding to execution of the first plurality of related queries during the first monitoring window;
storing or transmitting the query execution statistics (a) corresponding to execution of the first plurality of related queries and (b) identified based on the first sampling operation;

based on the first sampling operation: determining that none of a second plurality of related queries executed during the first sampling interval comprised in the first monitoring window; and responsive to determining that none of the second plurality of related queries executed during the first sampling interval: refraining from storing or transmitting, based on the first sampling operation, any query execution statistics corresponding to of the second plurality of related queries during the first monitoring window.

11. The system of claim 10, wherein the first plurality of related queries comprises queries that meet a similarity criteria.

12. The system of claim 10, wherein the query execution statistics are identified based on information that is temporarily stored in a buffer associated with the first monitoring window.

13. The system of claim 10, wherein the operations further comprise storing or transmitting the query execution statistics in association with a first time period that is between the first sampling interval and a second sampling interval that is prior to the first sampling interval.

14. The system of claim 10, wherein the first monitoring window includes a first time period and a second time period that is between the second sampling interval and a third sampling interval that is prior to the second sampling interval.

15. The system of claim 10, wherein the operations further comprise periodically or continuously updating a buffer based on the queries executing during a current monitoring window.

16. A method comprising:
identifying a first monitoring window, wherein:
at least one of a first plurality of related queries is executed during the first monitoring window,
the first plurality of related queries comprise queries sharing a first query characteristic,
at least one of a second plurality of related queries is executed during the first monitoring window, and
the second plurality of related queries comprise queries sharing a second query characteristic;
executing a first sampling operation to sample queries executing in a first sampling interval of a plurality of sampling intervals, the first sampling interval comprised in a portion of time in the first monitoring window;

based on the first sampling operation: determining that a first query, of a first plurality of related queries, executed during the first sampling interval comprised in the first monitoring window;

responsive to determining that the first query executed during the first sampling interval:
identifying a first set of query execution statistics corresponding to execution of the first plurality of related queries during the first monitoring window;
storing or transmitting the query execution statistics (a) corresponding to execution of the first plurality of related queries and (b) identified based on the first sampling operation;

based on the first sampling operation: determining that none of a second plurality of related queries executed during the first sampling interval comprised in the first monitoring window; and responsive to determining that none of the second plurality of related queries executed during the first sampling interval: refraining from storing or transmitting, based on the first sampling operation, any query execution statistics corresponding to the second plurality of related queries during the first monitoring window.

17. The method of claim 16, wherein the first plurality of related queries comprises queries that meet a similarity criteria.

18. The method of claim 17, wherein the query execution statistics are identified based on information that is temporarily stored in a buffer associated with the first monitoring window.

19. The method of claim 18, further comprising storing or transmitting the query execution statistics in association with a first time period that is between the first sampling interval and a second sampling interval that is prior to the first sampling interval.

20. The method of claim 18, wherein the first monitoring window includes a first time period and a second time period that is between the second sampling interval and a third sampling interval that is prior to the second sampling interval.

21. A method comprising:
determining that a first query, of a plurality of related queries, is executing during a first sampling interval of a plurality of sampling intervals;
responsive to determining that the first query is executing during the first sampling interval, identifying query execution statistics corresponding to execution of the plurality of related queries during a first monitoring window that is associated with first sampling interval, wherein the first monitoring window spans across a time period that includes multiple sampling intervals of the plurality of sampling intervals;
wherein the query execution statistics correspond to the execution of at least:
(a) the first query, the first query being initiated between the first sampling interval and a second sampling interval, of the plurality of sampling intervals, that is prior to the first sampling interval; and
(b) a second query of the plurality of related queries, the second query being initiated between the second sampling interval and a third sampling interval, of the plurality of sampling intervals, that is prior to the second sampling interval;
storing or transmitting the query execution statistics in association with the first sampling interval.

22. A system comprising:
at least one device including a hardware processor;

the system being configured to perform operations comprising:

determining that a first query, of a plurality of related queries, is executing during a first sampling interval of a plurality of sampling intervals;

responsive to determining that the first query is executing during the first sampling interval, identifying query execution statistics corresponding to execution of the plurality of related queries during a first monitoring window that is associated with first sampling interval, wherein the first monitoring window spans across a time period that includes multiple sampling intervals of the plurality of sampling intervals;

wherein the query execution statistics correspond to the execution of at least:

(a) the first query, the first query being initiated between the first sampling interval and a second sampling interval, of the plurality of sampling intervals, that is prior to the first sampling interval; and (b) a second query of the plurality of related queries, the second query being initiated between the second sampling interval and a third sampling interval, of the plurality of sampling intervals, that is prior to the second sampling interval;

storing or transmitting the query execution statistics in association with the first sampling interval.

\* \* \* \* \*

UNITED STATES PATENT AND TRADEMARK OFFICE
CERTIFICATE OF CORRECTION

PATENT NO. : 11,550,789 B2
APPLICATION NO. : 16/920248
DATED : January 10, 2023
INVENTOR(S) : Kumar et al.

It is certified that error appears in the above-identified patent and that said Letters Patent is hereby corrected as shown below:

In the Claims

In Column 23, Line 29, in Claim 10, delete "to of" and insert -- to --, therefor.

Signed and Sealed this
Tenth Day of October, 2023

Katherine Kelly Vidal
*Director of the United States Patent and Trademark Office*